United States Patent Office 3,294,484 Patented Dec. 27, 1966

3,294,484

PRODUCTION OF PALLADIUM CHLORIDE FOR DIMERIZING AROMATICS

Alan F. Ellis, Pittsburgh, Pa., assignor to Gulf Research & Development Company, Pittsburgh, Pa., a corporation of Delaware No Drawing. Filed Nov. 17, 1964, Ser. No. 411,712
3 Claims. (Cl. 23—87)

This invention relates to a process for dimerizing aromatic compounds.

Aromatic compounds that can be dimerized in accordance with the process defined herein include any aromatic compounds containing at least one replaceable hydrogen on the ring, such as monoaromatics, polyaromatics, heterocyclics, etc. The remaining carbons on the ring in such aromatics can be bonded to hydrogen or they can be bonded to halogens or other substituents such as alkyl substituents having from one to 20 carbon atoms, acyl substituents, alkoxy substituents, phenoxy substituents, hydroxyl substituents, carboxyl substituents, ester substituents, amine substituents, etc. Specific examples of aromatic compounds that can be dimerized include benzene, toluene, cumene, biphenyl, naphthalene, phenol, anisole, diphenyl ether, m-xylene, o-xylene, p-xylene, chlorobenzene, phenyl acetate, beta-phenyl, beta, beta-dimethylpropionate, N,N-dimethylaniline, pyridene, etc. Extremely good results are obtained when the aromatic being dimerized herein is o-xylene.

The aromatics defined above are dimerized by reacting the same with chlorides of the platinum metals, such as platinum chloride ($PtCl_2$) or palladium chloride ($PdCl_2$), etc. Using palladium or palladium chloride as representative for purposes of illustration herein of the platinum metal or the platinum metal chlorides, respectively, the process involves the reaction of a replaceable hydrogen on the ring of each of two molecules of aromatics being dimerized with one molecule of palladium chloride to form one molecule of the desired dimer, two molecules of hydrogen chloride and metallic palladium. The amount of palladium chloride required, therefore, for such reaction is at least one mol per mol of dimer so produced.

The reactant aromatic can be a liquid or a solid. Palladium chloride is a solid. In order to effect reaction between the two it is necessary to place the reactants in a homogeneous liquid state. For this purpose a solvent for the reactants is employed that does not react with the reactants or product formed or does not adversely affect the course of the reaction. Polar solvents are preferred for such purpose, such as ketones, esters, amides, nitriles, carboxylic acids, nitrocompounds, etc. Examples of such solvents that can be employed includes acetone, methyl ethyl ketone, ethyl acetate, dimethylformamide, nitromethane, acetic acid, benzoic acid, etc. Of these I prefer to employ carboxylic acids because organic acid buffer solutions will operate as acid-fixing agents as set forth hereinafter. Acetic acid is particularly effective as a solvent for this reaction. The amount of solvent required is not critical, as long as it is sufficient to solubilize the remaining components of the reaction mixture, but, in general, the amount thereof can be at least about one mol, preferably about two to about 10 mols, per total mols of the remaining components of the reaction system.

Since hydrogen chloride is produced during this process as a by-product and can adversely affect the course of the desired reaction, I also add to the reaction system an acid-fixing agent that will react with the hydrogen chloride so produced and thereby neutralize the same, such as alkaline earth metal oxides, salts of strong bases and weak acids, alkaline and alkaline earth metal salts, organic acid salts, etc. Specific examples of acid-fixing agents that can be employed are potassium carbonate, di- and tri-sodium phosphate, borax, sodium acetate, potassium benzoate, disodium phthalate, etc. Of these I prefer to employ sodium acetate in acetic acid for ease of operation and economy. The amount of acid-fixing agent that must be employed is at least the amount stoichiometrically required to react with the hydrogen chloride produced during the reaction. As a result of the reaction between the buffer and the hydrogen chloride a neutral salt and a weak acid are produced.

The reaction is carried out under relatively mild conditions. Thus, a temperature of about 40° to about 200° C., preferably about 50° to about 125° C., and a pressure of about 0 to about 30 pounds per square inch gauge, preferably atmospheric pressure, can be employed. The reaction time can be a period of about one to about 24 hours, but preferably is about three to about 10 hours.

At the end of the reaction period the dissolved palladium chloride has been converted to insoluble palladium metal particles, which in size can range, for example, from about five to about 400 microns. The reaction mixture produced can contain dissolved in the solvent the desired dimer, the reaction product of the hydrogen chloride and the acid-binding agent, in some cases unreacted components, and dispersed palladium metal. The palladium metal is separated from the reaction mixture in any suitable manner, for example, by filtration. The filtrate can be treated in any suitable manner to recover the desired dimer. Thus, the filtrate can be heated at a temperature of about 50° to about 130° C. and a pressure of about 10 to about 100 millimeters of mercury to drive off the solvent. The salt produced by reaction of the acid-binding agent and the hydrogen chloride will precipitate out and can be removed from the desired dimer by filtration.

While the process defined above is an extremely attractive process for preparation of the defined dimer, the use of palladium chloride, a compound bearing a high cost, as reatant with the aromatic charge renders the same commercially unattractive. I have found that the process can be made attractive by recovering the palladium metal at the end of the reaction period as pointed out above, suspending the palladium metal in a solvent for palladium chloride, defined above, and thereafter contacting the same with chlorine in an amount at least stoichiometrically required to react therewith to form palladium chloride. As the palladium on the surface of the metal reacts with chlorine it forms palladium chloride and goes into solution in the solvent employed, thus presenting a fresh surface for reaction with chlorine. This is continued until all of the palladium is converted to palladium chloride and a solution of solvent and palladium chloride is obtained. The conversion of palladium metal to palladium chloride can be effected at a temperature of about 10° to about 100° C., preferably about 25° to about 75° C. and a pressure of about 0 to about 40 pounds per square inch gauge, preferably about two to about 20 pounds per square inch gauge, for about 10 minutes to about two hours, preferably for about 15 minutes to about 45 minutes.

The advantages of operating in accordance with the dictates of the procedure defined herein are many. The recovery, regeneration and reuse of palladium chloride in the defined process reduces materially the total costs of the process. Since the solvent employed in the regeneration procedure can be, and in the preferred embodiment is, the same solvent employed in the dimerization reaction, the number of solvents employed in the overall process is cut down to a minimum. Since the solvent employed in the dimerization reaction can be recovered from the dimer produced, the recovered solvent can also be employed in the regeneration step and the solution obtained can be used in the dimerization step further to reduce the costs involved. And since the dimerization reaction must be carried out under anhydrous conditions, since water deactivates the compound, for example, palladium chloride, which is formed, and the regeneration procedure defined is also carried out under anhydrous conditions, no complications arise in employing the solution obtained during regeneration in the dimerization stage of the process.

Dimers that are produced in accordance with the procedure defined herein include biphenyl, 4,4'-dimethylbiphenyl, 3,4,3',4'-tetramethylbiphenyl, 4,4'-dimethoxybiphenyl, 4,4'-diphenoxybiphenyl, para-quatraphenyl, 2,2'-binaphthyl, 4,4'-dichlorobiphenyl, 4,4'-diacetoxybiphenyl, 4,4'-bis(1,1-dimethyl-2-methoxycarbonylethyl) biphenyl, 4,4'-bis(dimethylamino) biphenyl, 4,4' - bipyridyl, etc. These dimers can be employed as chemical intermediates, plasticizers, epoxy curing agents, etc.

The process of this invention can be illustrated by the following:

*Example I*

A mixture of 80 grams (0.75 mol) of ortho xylene, 300 milliliters (5.0 mols) of glacial acetic acid, 16 grams (0.2 mol) of sodium acetate and 54 grams (0.3 mol) of anhydrous palladium chloride was heated at a temperature of 118°–130° C. and atmospheric pressure over a period of 10 hours. The cooled solution was poured into 800 milliliters of water and the resulting organic products were extracted with 200 cubic centimeters of benzene. Distillation of the water-washed benzene solution produced 17 grams of 3,4,3',4'-tetramethylbiphenyl having a melting point of 75°–77° C. after recrystallization from ethanol. There was also recovered by filtration of the reaction mixture 32 grams of palladium. This represents essentially quantative reduction of the palladium chloride to palladium.

*Example II*

Forty-two grams of anhydrous palladium metal (0.4 mol) recovered from reactions operated in accordance with the process defined in Example I were suspended in 150 milliliters of glacial acetic acid and the suspension was stirred at a temperature of 25°–30° C. and atmospheric pressure while chlorine was passed therethrough at a rate of 1.5 mil per hour. The suspension became red immediately indicating the formation of palladium chloride. At the end of the chlorine addition there were no suspended solids present. The resulting solution was evaporated to dryness at a temperature of 90° C. and a pressure of 100 millimeters of mercury to give 70 grams of anhydrous palladium chloride. This amounts to 100 percent conversion of palladium metal to palladium chloride.

Obviously many modifications and variations of the invention, as hereinabove set forth, can be made without departing from the spirit and scope thereof and therefore only such limitations should be made as are indicated in the appended claims.

I claim:

1. A process for converting palladium metal to palladium chloride which comprises reacting palladium metal with chlorine in anhydrous carboxylic acid at a temperature at about 10° to about 100° C.

2. A process for converting palladium metal to palladium chloride which comprises reacting palladium metal with chlorine in anhydrous acetic acid at a temperature at about 10° to about 100° C.

3. A process for converting palladium metal to palladium chloride which comprises reacting palladium metal with chlorine in anhydrous acetic acid at a temperature at about 25° to about 75° C.

References Cited by the Examiner

UNITED STATES PATENTS 3,145,237 8/1964 Van Helden et al. ---- 260—670

FOREIGN PATENTS 879,074 10/1961 Great Britain.

DELBERT E. GANTZ, *Primary Examiner.*

G. E. SCHMITKONS, *Assistant Examiner.*